(12) United States Patent
Marashdeh et al.

(10) Patent No.: US 10,057,475 B2
(45) Date of Patent: Aug. 21, 2018

(54) HIGH MASS LIGHT POLE INSPECTION AND TRANSPORT SYSTEM

(71) Applicants: Tech4Imaging LLC, Columbus, OH (US); Infrastructure Preservation Corporation, Clearwater, FL (US)

(72) Inventors: Qussai Marashdeh, Columbus, OH (US); Bradley Hunter, Lexington, MA (US); William Seavey, Safety Harbor, FL (US)

(73) Assignees: Tech4Imaging LLC, Columbus, OH (US); Infrastructure Preservation Corporation, Clearwater, FL (US)

( * ) Notice: Subject to any disclaimer, the term of this patent is extended or adjusted under 35 U.S.C. 154(b) by 366 days.

(21) Appl. No.: 14/977,860

(22) Filed: Dec. 22, 2015

(65) Prior Publication Data

US 2017/0180612 A1    Jun. 22, 2017

(51) Int. Cl.

| | |
|---|---|
| *H04N 9/47* | (2006.01) |
| *H04N 7/18* | (2006.01) |
| *H04N 5/232* | (2006.01) |
| *F16M 13/02* | (2006.01) |
| *F16M 11/42* | (2006.01) |
| *G06T 7/00* | (2017.01) |
| *H04N 5/225* | (2006.01) |

(52) U.S. Cl.
CPC ....... *H04N 5/23203* (2013.01); *F16M 11/425* (2013.01); *F16M 13/022* (2013.01); *G06T 7/0004* (2013.01); *H04N 5/2251* (2013.01); *H04N 7/181* (2013.01)

(58) Field of Classification Search
CPC .. H04N 5/23203; H04N 7/181; H04N 5/2251; F16M 11/425; F16M 13/022; G06T 7/0004
USPC ................................ 348/115, 121, 123, 124
See application file for complete search history.

(56) References Cited

U.S. PATENT DOCUMENTS

| | | | |
|---|---|---|---|
| 4,737,621 A | 4/1988 | Gonsiorowski et al. | |
| 7,006,211 B1* | 2/2006 | Belew ................. | G01N 21/952 |
| | | | 174/60 |
| 7,496,454 B2 | 2/2009 | Rogers et al. | |
| 8,614,707 B2 | 12/2013 | Warsito et al. | |
| 9,535,026 B2 | 1/2017 | Marashdeh et al. | |
| 2009/0222221 A1 | 9/2009 | Buyukorturk et al. | |
| 2010/0033186 A1 | 2/2010 | Overweg et al. | |
| 2011/0068773 A1 | 3/2011 | Harkness et al. | |
| 2013/0085365 A1 | 4/2013 | Marashdeh et al. | |
| 2013/0127452 A1* | 5/2013 | Boenisch ........... | G01N 27/9033 |
| | | | 324/242 |
| 2014/0010954 A1* | 1/2014 | Hobson, III ............. | H02G 1/02 |
| | | | 427/117 |
| 2014/0312580 A1* | 10/2014 | Gale .................... | B60G 21/073 |
| | | | 280/5.509 |

(Continued)

FOREIGN PATENT DOCUMENTS

JP    2013245496 A    12/2013

*Primary Examiner* — Jared Walker
(74) *Attorney, Agent, or Firm* — Standley Law Group LLP

(57) ABSTRACT

A motorized high mast pole inspection device that is self-powered and autonomous with respect to the internal lever of a high mast pole. The inspection device provides a means for mechanically climbing a vertical, cylindrical, tubular high mast light pole. Video monitoring and recording equipment may be deployed on the device for inspecting high mast light poles.

21 Claims, 8 Drawing Sheets

(56) References Cited

U.S. PATENT DOCUMENTS

2015/0210111 A1  7/2015  Lin

\* cited by examiner

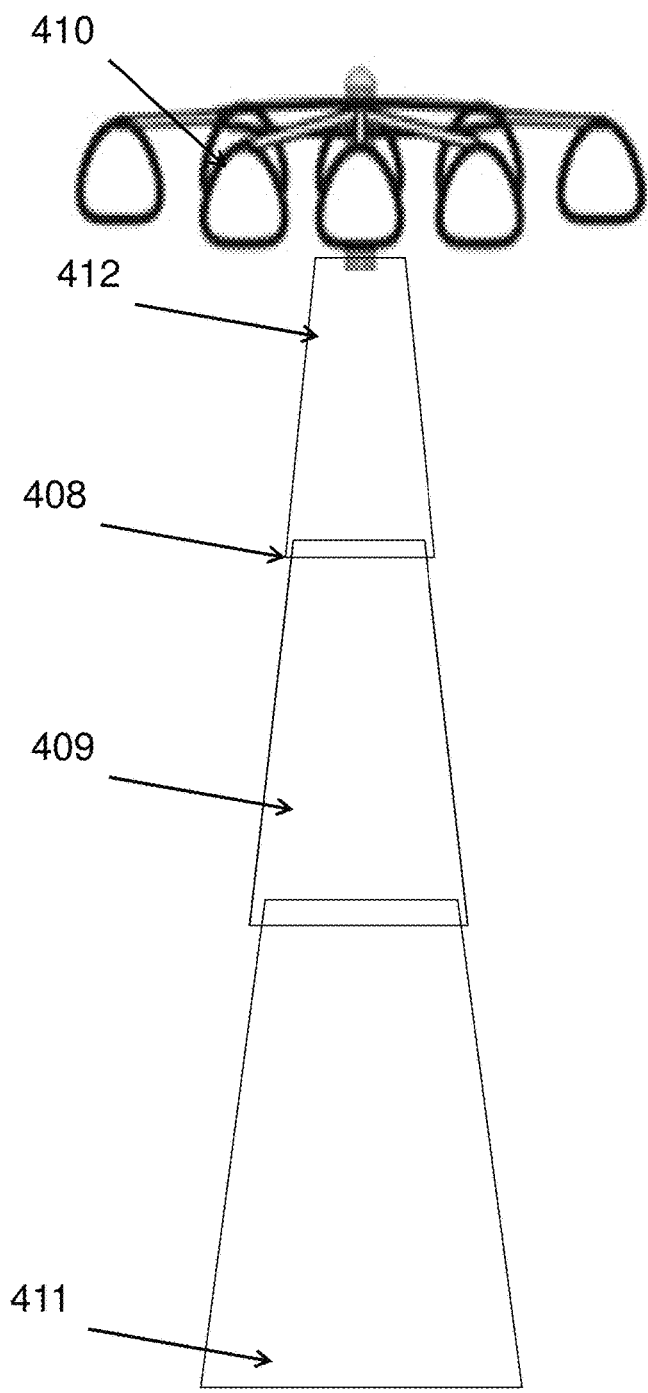
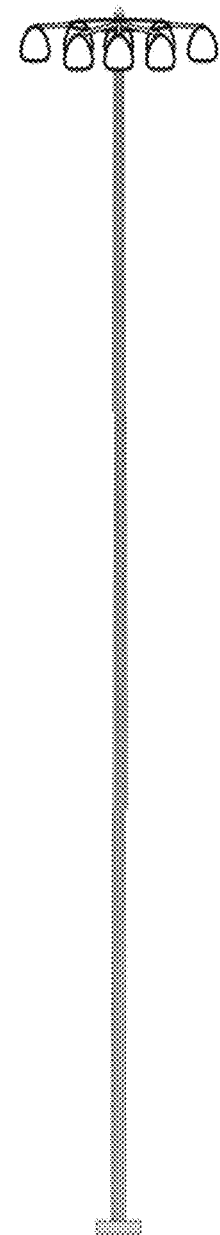
Figure 4A
Figure 4B

HIGH MASS LIGHT POLE INSPECTION AND TRANSPORT SYSTEM

BACKGROUND AND SUMMARY OF THE INVENTION

The present invention is directed to a motored high mast pole inspection device that is self-powered and autonomous with respect to the internal lever of a high mast pole. The present invention provides a means for mechanically climbing a vertical, cylindrical, tubular high mast light pole.

The present invention also provides a means to deploy video monitoring and recording equipment for inspecting high mast light poles. A transport system is adapted for transporting and providing a platform to support inspection equipment. The transport system allows for inspection, repair and/or surveillance on vertical high mast light poles.

The transport system is adapted to maintain a secure grip as it maneuvers and/or travels vertically up and down a cylindrical pole that varies in diameter (e.g., as the cylindrical tubular shaped pole decreases in diameter as the height up the pole increases).

Tall steel tubular or cylindrical towers (or poles) that provide illumination at highway interchanges must be visually inspected periodically. The towers are typically tapered starting at the base (e.g., the base being up to 24 inches in diameter and tapering to as small as 7 inches at the top of a 120 foot tall pole). The tower is typically constructed in vertical sections that fit snugly together with an upper section slightly overlapping a lower section. The condition of the steel at the joints between sections is one of the focuses of the inspection.

One existing means of inspection involves a person in a bucket truck inspecting joints that are less than 80 feet in height. In this method, a crane is used to hoist a person to access joints at higher elevations. It can be difficult to bring a vehicle adjacent to some poles due to terrain or access restrictions. The vehicle also represents a significant expense.

An alternative method involves ground-based inspection using a telescope. With this method, it is often difficult to see a crack with the limited viewing angles that are possible from the ground. Also, the telescope must be moved to multiple locations around the pole in order to view the circumference of all seams. Certain viewing angles may be restricted due to access, terrain, obstacles or solar glare.

In one prior system (U.S. Pat. No. 7,496,454 B2), a ring with cameras was proposed to inspect high mast poles. However, that design did not rely on robotic movements and rather utilized the mechanism of the existing lever in high mast poles. Using robotic means are deemed problematic and limited in their ability to inspect high mast poles of varying diameters or poles that vary in diameter relative to height.

A need exists for an improved method and system for inspecting high mast towers completely and economically using automated robotic means that is flexible enough to be used on multiple types of high mast poles. The solution also needs to work independently of internal levers in high mast poles and is also required to work on poles of different materials. The present invention solves these problems while also being economical and easy to transport between towers. The present invention as also allows complete inspection coverage of the seams and inspection of the full length of the pole and luminaries.

The high mast inspection device of the present invention is adapted to carry multiple cameras up and down high steel towers. The cameras are strategically arranged to ensure complete 360 degree horizontal coverage of the pole. The cameras can send real-time still images and/or video to an operator on the ground while simultaneously recording high resolution still and/or video images to a non-volatile memory device in each camera. If an operator sees an irregularity, or something of interest, the user can manipulate the invention and cameras to gather increased detail around a specific site.

The present invention is adapted to maneuver or travel up cylindrical, vertical poles of varying diameter. The present invention also has the ability to generate enough gripping power to maintain traction on various types of surfaces, including those that are neither flat nor smooth. The present invention is also adapted with a payload section that can transport surveillance and/or inspection cameras. In the preferred embodiment, the present invention can manipulate and change the orientation of the surveillance and inspection equipment by remote control. In the preferred embodiment, the present invention is adapted to record the image and/or video information and/or data while allowing the user to remotely view and monitor the data and/or video simultaneously.

The foregoing and other features and advantages of the present invention will be apparent from the following more detailed description of the particular embodiments, as illustrated in the accompanying drawings.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein:

FIGS. 4A and 4B illustrate one embodiment of a high mast light pole;

DETAILED DESCRIPTION OF EXEMPLARY EMBODIMENT(S)

Figure 1:
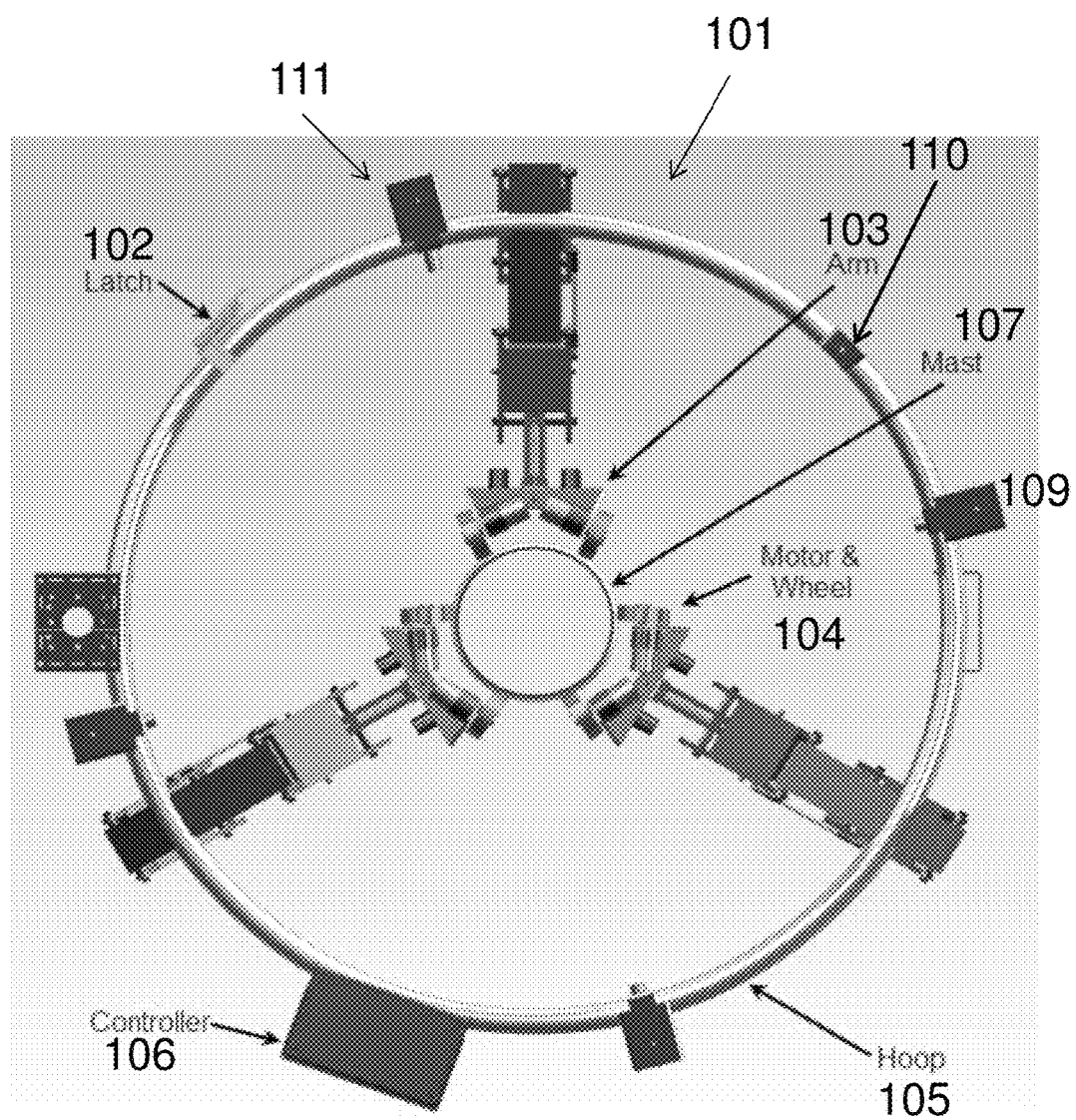
FIG. 1 illustrates a top view of one embodiment of a inspection device of the present invention on an 8 inch diameter pole mast.

The following detailed description of the example embodiments refers to the accompanying figures that form a part thereof. The detailed description provides explanations by way of exemplary embodiments. It is to be understood that other embodiments may be used having mechanical and electrical changes that incorporate the scope of the present invention without departing from the spirit of the invention.

DRAWINGS—REFERENCE NUMERALS

101—Inspection device assembly
102—Latch on the hoop
103—Arm that holds driven wheels
104—Motor and wheels
105—Support hoop (hoop)
106—Housing containing controller
107—High pole mast (top view small diameter)
109—Camera or video equipment mounts
110—Supporting hoop hinge
111—Camera
112—Wheel mount
201—Angle sensor
202—Extended spring holding clip
203—Supporting leg
207—Parallelogram linkage
208—Constant force spring
408—Seam or junction of two sections of high mast light pole
409—Section of high mast light pole
410—Light fixture
411—Base (proximal end to the ground) of high mast light pole
412—Top (distal end to the ground) of high mast light pole
501—Wireless RC remote controller unit
502—Variable position joystick
503—Forward position of joystick indicator
504—Reverse position of joystick indicator
505—Neutral position of joystick indicator
601—Camera or video equipment
602—Ribbon
603—Connector In one embodiment of the invention, the inspection device of the present invention (also called the "crawler") preferably has three arms 103, each preferably having four driven wheels 104 on each arm (in the preferred embodiment, the wheels are motorized to drive the device up and down the pole). The wheels are mounted on wheel mounts 112 that allow the wheels to turn. In the preferred embodiment, each of the wheel mounts are connected to a support frame. In one embodiment, the support frame is comprised of arms 103 having a parallelogram linkage as described below. The arms are preferably spring 208 loaded against the pole mast 107 by connecting each of them to an extended spring holding clip 202. The spring 208 continuously pulls the holding clip 202 inwards so that the wheels 104 maintain a firm grip on the mast 107 and provide sufficient normal force to the drive wheels 104. The spring 208 works by being attached to a hinge or holding clip attached to the arm. The spring pulls the arm continuously and makes sure the wheels are pressed against the mast as the mast changes diameter. See FIG. 7.

In one embodiment, there are four (4) small DC gearmotors that drive the four wheels 104 on each arm 103. The motors on each arm 103 are connected in parallel (the 4 motors on each arm preferably receive the same voltage) and are driven from a controller 106.

The arms 103 move to press against the mast surface using a parallelogram linkage 207 connected to a surrounding hoop 105. The parallelogram linkage is operationally connected to the spring 208 and is configured to move the arm to keep force on the pole mast as the device moves along the pole. The arm moves as the mast shrinks in diameter to keep contact with the mast. In this embodiment, the hoop is adapted for placement around the pole mast and supports the camera and video equipment for inspecting the pole. As depicted, the parallelogram linkage is pivotally attached to the arm to allow the hoop to remain substantially perpendicular to the pole mast as the device moves up and down the pole having a varying diameter.

The hoop 105 is preferably hinged 110 to allow the inspection device to be wrapped around the lowest part of a mast then closed with a latch 102 to form a complete circle. (It is appreciated that the hoop may be configured to be open instead of a completely closed loop). The parallelogram linkage 207 provides a stabilizing moment to the hoop 105 by kinematically coupling the plane of the hoop 105 to the axis of the pole. However, the inspection device must climb over the seams 408 at the junction between segments 409 of the pole mast 107. The crawler wheels 104 are allowed to pivot over a narrow range on the end of the parallelogram linkage 207 to permit travel over the seams 408. Springs 208 from the arms provide stiffness around the pivot axis which, in turn, provides stiffness to maintain the plane of the hoop 105 normal (90 degrees) to the axis of the pole mast.

The parallelogram linkage 207 is adapted to accommodate a wide range of pole mast 409 diameters between the base 411 and top 412 of a pole mast 107. A constant force spring 208 is used to load the drive wheels 104 against the pole mast 107 providing a substantial constant force pressing the wheels 104 against the pole mast 107 surface regardless of the change in mast diameter. This constant force is applied by attaching the coiled spring 208 to the arm holding clip 202 using a ribbon 602.

In one embodiment, the operator sends commands to the inspection device using a radio control (RC) transmitter 501. The controller 106 receives "throttle" commands from the RC transmitter 501 via an RC receiver housed in and connected to the controller 106. The operator pushes a joystick 502 forward 503 on the RC transmitter 501 to command the inspection device 101 to ascend the pole, pulling the joystick 502 backward 504 causes the inspection device 101 to descend. Leaving the joystick 502 in the neutral position 505 causes the inspection device 101 to remain stationary on the mast.

In one embodiment, the inspection device 101 is battery operated and can be periodically recharged. An angle sensor 201 attached to each parallelogram linkage. The angle being measured is between the parallelogram linkage and the plane of the hoop. This angle is used to ensure that the pole is always centered in the hoop. When all angles are substantially the same, the pole is centered. If one angle gets larger than the others, the controller controls the motors to the wheels to adjust their power. Angles measured from all the angle sensors should be similar for proper operation. The controller 106 uses the angle measurement to keep the hoop perpendicular to the pole mast by maintaining all angles equal. The drive wheels are controlled to keep the angles from all arms equal such that the inspection device can move and maintain its balance (e.g., balanced as in keeping the hoop plane perpendicular to the mast). The measured angle is also used to determine the pole mast 107 diameter by calculating the average of the distance of the three sets of drive wheels 104 from the crawler centerline. Variation in the distance is used to determine deviation of the mast centerline from the crawler center. The controller modulates the voltage to the motors on the three arms in a feedback loop so as to maintain the inspection device centered on the mast.

Operation: FIG. 1 illustrates a top view of one embodiment of an inspection device of the present invention on 8 inch diameter pole mast. In this embodiment of the inspection device 101, a latch 102 is used to install and release the inspection device 101 for testing multiple poles. In this embodiment, the inspection device has three arms 103, each equipped with four motors 104, a hoop 105 that holds the geometry together, and a controller box 106 to receive wireless instructions.

Figure 2:
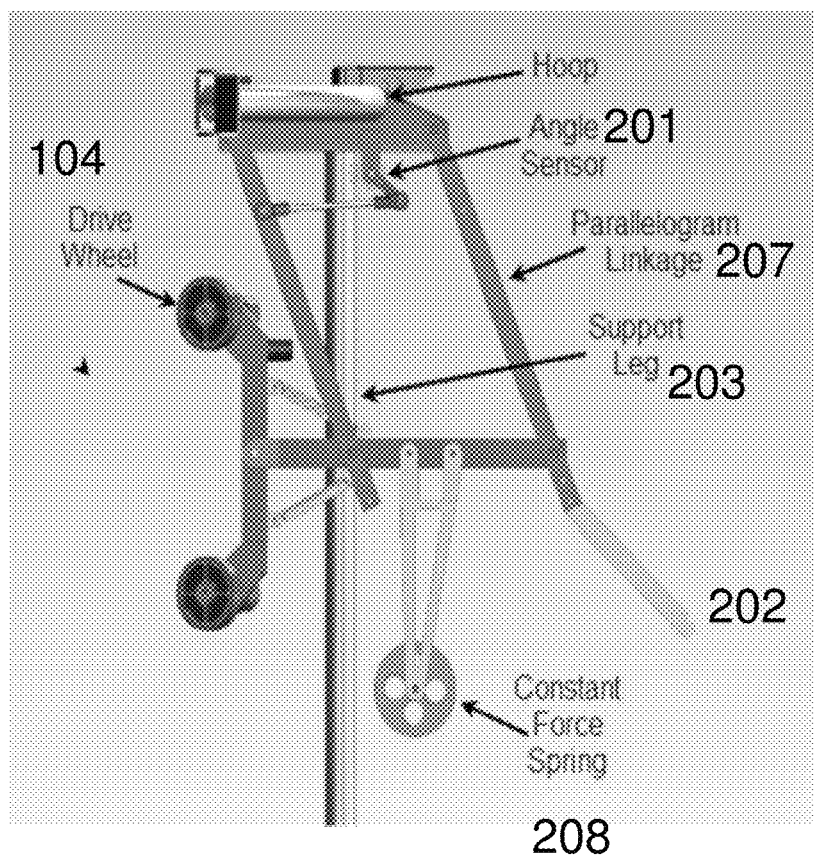
FIG. 2 illustrates a side view of the arm and driving wheels.

FIG. 2 illustrates a side view of arm and driving wheels of the device of FIG. 1. A constant force spring 208 ensures the inspection device 101 is continuously attached to the pole mast 107 at different diameters. The angle sensor 201 ensures the inspection device 101 is stable during its ascend and descend and sends back angle readings to the controller 106 to correct its motion. The parallelogram linkage provides a mechanism to fix the inspection device at the base of the pole 107.

Figure 3:
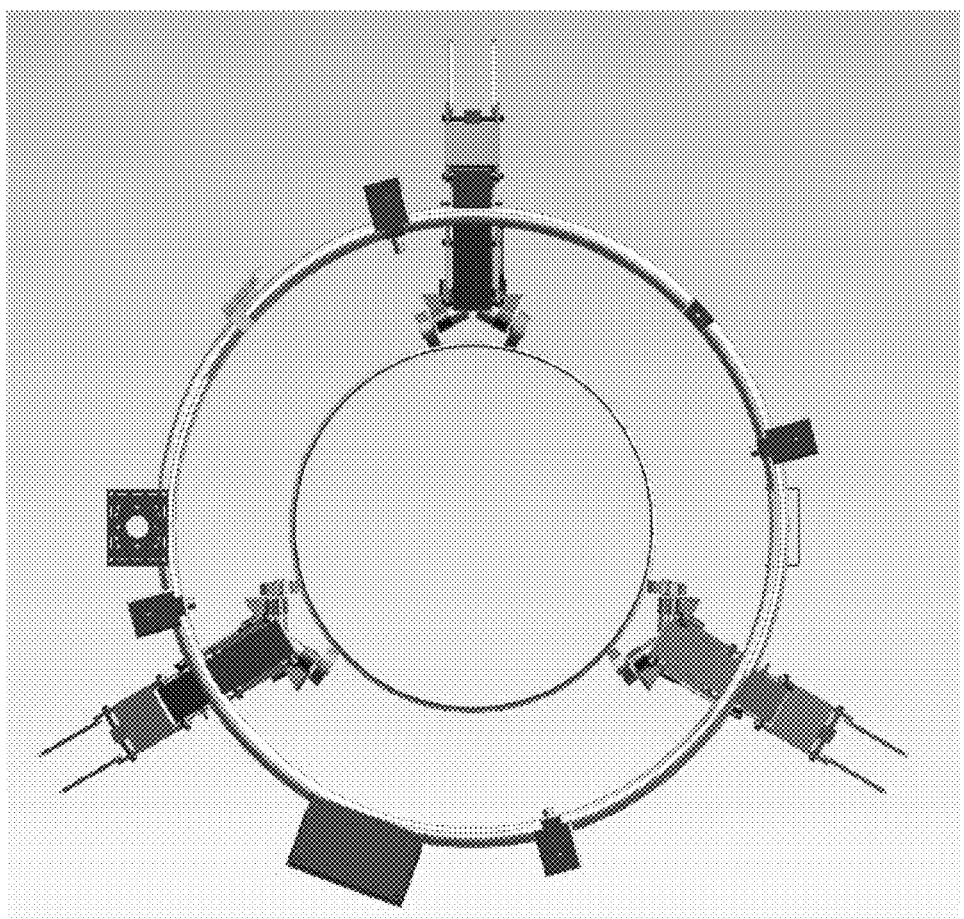
FIG. 3 illustrates a top view of the inspection device on a 24 inch diameter pole mast.

FIG. 3 illustrates a top view of the inspection device on a 24 inch diameter pole mast. Here, the arms are pushed outwards while the spring maintains force to keep the crawler's drive wheels attached to the pole. As the inspection device moves up and down the pole it will be able to stay stable via the controller. The controller will adjust the drive wheels to maintain this stability that is achieved by the feedback from the angle sensors.

FIGS. 4A and 4B illustrate one embodiment of a high mast light pole (4A is a close-up view). FIG. 4A depicts the sections 409 of a high mast light pole. Each section is linked together at a seam 408. This is typically a place of interest during an inspection. It also poses a potential problem for an inspection device in that each higher section 409 has a seam that has an increase in diameter at the seam.

Figure 5:
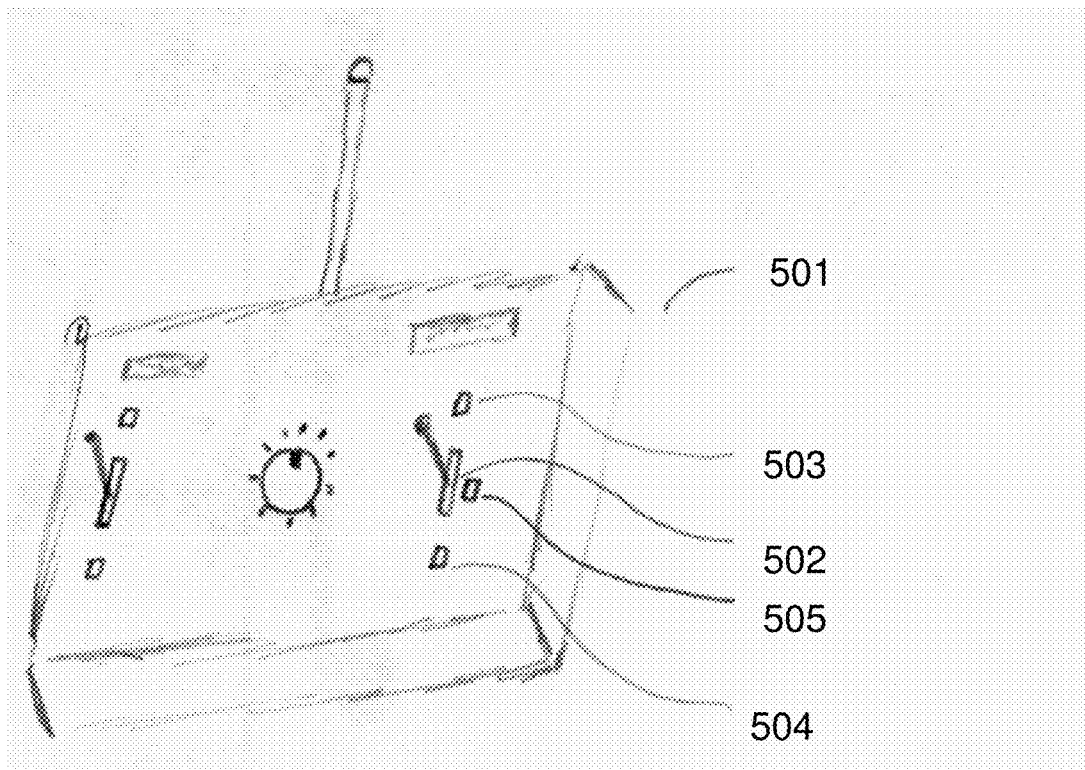
FIG. 5 illustrates one embodiment of a wireless RC remote control unit.

FIG. 5 illustrates one embodiment of a wireless RC remote control unit. The RC device is used to control the crawler operation remotely. By attaching the inspection device onto a high mast light pole, one can remotely send the invention from the bottom of the pole mast 411 to the top 412 while recording and simultaneously monitoring the surface of the pole mast.

Figure 6:
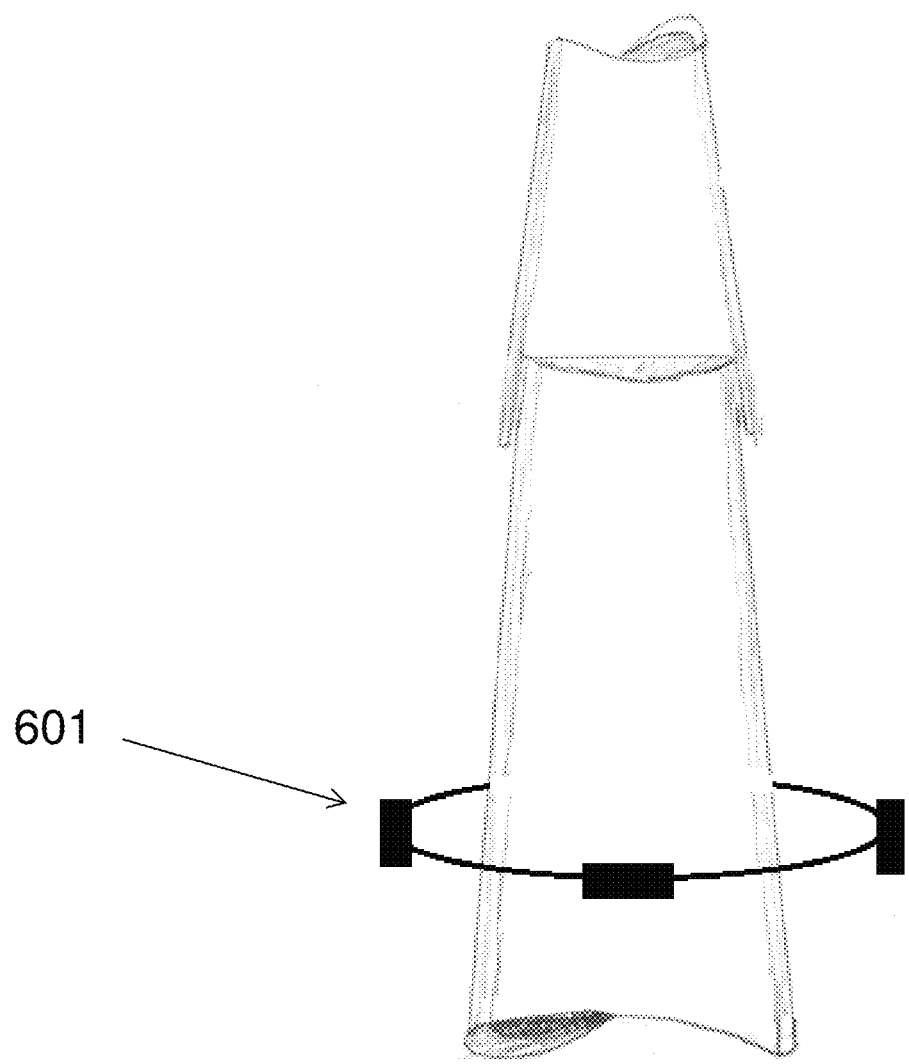
FIG. 6 illustrates two sections of a high mast light pole with a hoop supporting camera.

FIG. 6 illustrates two sections of a high mast light pole with a hoop supporting camera. FIG. 6 shows a constant diameter hoop that moves up a pole mast carrying a camera 111 or recording equipment 601 on the hoop's camera mounts 109. The video recording equipment can record the pole mast from bottom to the top and the full circumference of the pole. The information can be stored in a local means and transmit wirelessly at the same time.

Figure 7:
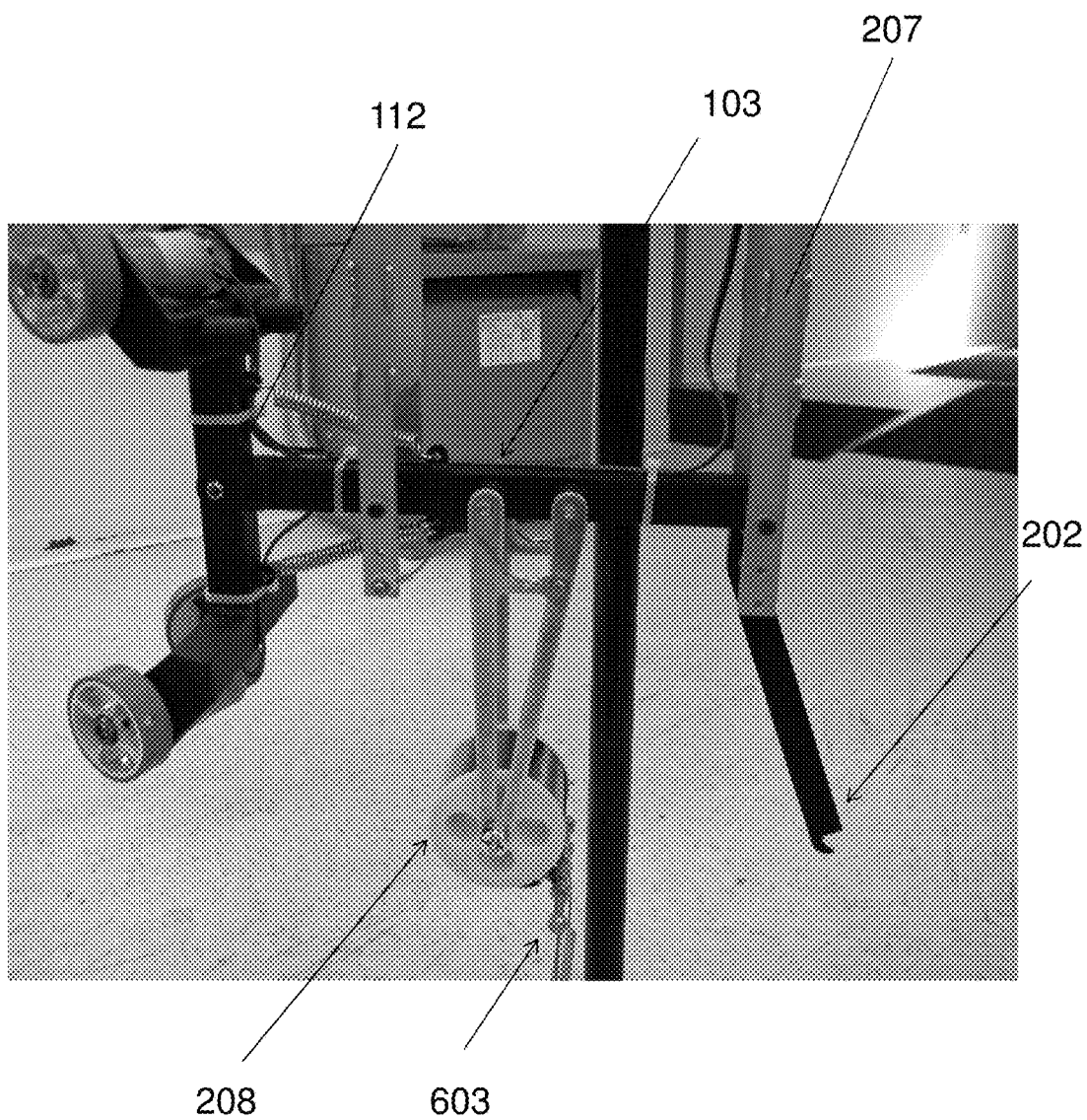
FIG. 7 illustrates another view of the coiled spring, clip and connector.
Figure 8:
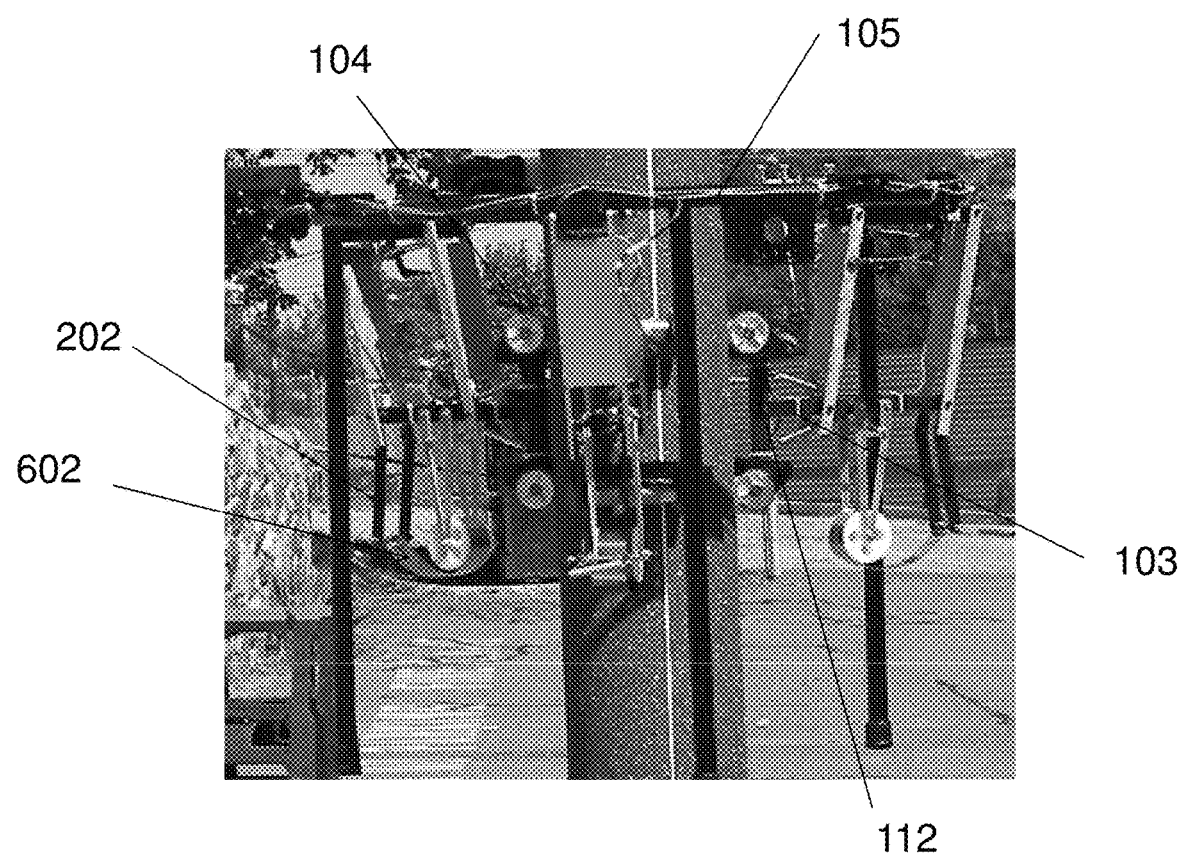
FIG. 8 illustrates the inspection device of the present invention installed on a pole.

FIG. 7 illustrates another view of the present invention depicting the coiled spring, hinge and connector 603 (ribbon is not attached in this figure). The connector is attached to the clip 202. FIG. 8 illustrates the inspection device of the present invention installed on a mast.

While certain embodiments of the present invention are described in detail above, the scope of the invention is not to be considered limited by such disclosure, and modifications are possible without departing from the spirit of the invention as evidenced by the following claims:

What is claimed is:

1. An apparatus for inspecting poles, comprising:
   a first wheel for riding on the pole being inspected;
   a first wheel mount operationally connected to the first wheel mount;
   a second wheel for riding on the pole being inspected;
   a second wheel mount operationally connected to the first wheel mount;
   a support frame connected to the first and second wheel mounts;
   a plurality of cameras supported in place by the support frame;
   a plurality of motors for driving each of the wheels;
   a camera support adapted to be placed around the pole for supporting the plurality of cameras, the camera support supported by the support frame;
   wherein the camera support is adapted to open and close to surround the pole to be inspected;
   wherein the support frame is comprised of an arm attached to each wheel mount and a linkage member attached to each arm;
   a plurality of springs, operationally connected to each of the linkage members wherein the springs are adapted to maintain the wheels against the pole as the apparatus rides along the pole; and
   wherein the apparatus is spring loaded to maintain the first and second wheels against the pole as the apparatus is driven up the pole.

2. An apparatus according to claim 1, wherein the camera support is a hoop adapted to be opened and closed around the pole.

3. An apparatus according to claim 1, further comprising:
   a hinge operationally connected to the support frame for allowing the support frame to be opened and closed;
   a latch for closing support frame into a secured engagement.

4. An apparatus according to claim 1, further comprising:
   a plurality of holding clips supported by each of the linkage members; and
   a plurality of ribbons for connecting each of the springs to the holding clips, and wherein the ribbons are adapted to maintain the apparatus spring-loaded against the pole when connected between the springs and holding clips.

5. An apparatus according to claim 1, further comprising:
   a controller in electrical communication with the plurality of motors;
   an angle sensor supported by the support frame for determining the angle measurements between the camera support and each of the linkage members and communicating the angle measurements to the controller for adjusting the wheels so that the pole is centered with respect to the apparatus.

6. An apparatus according to claim 1, wherein the plurality of cameras allows for viewing from all directions.

7. An apparatus according to claim 1, wherein each of the linkage members are pivotally attached to one of the arms to allow the camera support to remain substantially perpendicular to the pole as the device moves up and down the pole having a varying diameter.

8. An apparatus according to claim 5, wherein the angle sensor is configured to communicate the angle measurements to the controller for keeping the camera support perpendicular to the pole.

9. An apparatus according to claim 8, wherein the controller is adapted to control the plurality of motors to maintain the angles of the camera support equal such that the apparatus can move and maintain balance.

10. An apparatus according to claim 5, wherein each of the wheels are adapted to pivot over a narrow range to allow the apparatus to travel over the seams on the pole.

11. An apparatus according to claim 5, wherein the springs provide stiffness around a pivot axis to maintain the plane of the camera support substantially 90 degrees to the axis of the pole.

12. An apparatus according to claim 5, wherein the controller is adapted to modulate the voltage to the motors in a feedback loop so as to maintain the apparatus centered on the pole.

13. An apparatus for inspecting poles, comprising:
a first wheel for riding on the pole being inspected;
a first wheel mount operationally connected to the first wheel mount;
a second wheel for riding on the pole being inspected;
a second wheel mount operationally connected to the first wheel mount;
a support frame connected to the first and second wheel mounts, wherein the support frame is comprised of an arm attached to each wheel mount and a parallelogram linkage attached to each arm;
a plurality of cameras;
a camera support adapted to be placed around the pole for supporting the plurality of cameras, the camera support supported by the support frame;
a plurality of motors for driving each of the wheels;
a plurality of springs operationally connected to each of the parallelogram linkages wherein the springs are adapted to maintain the wheels against the pole as the apparatus rides along pole;
wherein the apparatus is spring loaded to maintain the first and second wheels against the pole as the apparatus is driven up the pole;
a controller in electrical communication with the plurality of motors;
an angle sensor supported by the support frame for determining the angle measurements between the camera support and each of the parallelogram linkages and for communicating the angle measurements to the controller for controlling the motors so that the pole is centered with respect to the apparatus.

14. An apparatus according to claim 13, wherein the camera support is adapted to open and close to surround the pole to be inspected.

15. An apparatus according to claim 13, wherein the camera support is a hoop.

16. An apparatus according to claim 13, wherein each of the parallelogram linkages are pivotally attached to one of the arms to allow the camera support to remain substantially perpendicular to the pole as the device moves up and down the pole having a varying diameter.

17. An apparatus according to claim 13, wherein the angle sensor is configured to communicate the angle measurements to the controller for keeping the camera support perpendicular to the pole.

18. An apparatus according to claim 13, wherein the controller is adapted to control the plurality of motors to maintain the angles of the camera support equal such that the apparatus can move and maintain balance.

19. An apparatus according to claim 13, wherein each of the wheels are adapted to pivot over a narrow range to allow the apparatus to travel over the seams on the pole.

20. An apparatus for inspecting poles, comprising:
a first wheel for riding on the pole being inspected;
a first wheel mount operationally connected to the first wheel mount;
a second wheel for riding on the pole being inspected;
a second wheel mount operationally connected to the first wheel mount;
a support frame connected to the first and second wheel mounts,
a plurality of cameras;
a camera support adapted to be placed around the pole for supporting the plurality of cameras, the camera support supported by the support frame;
a plurality of motors for driving each of the wheels; and
wherein the apparatus is spring loaded to maintain the first and second wheels against the pole as the apparatus is driven up the pole;
a controller in electrical communication with the plurality of motors;
a remote control unit for controlling the apparatus;
a plurality of springs operationally connected to each of the parallelogram linkages wherein the springs are adapted to maintain the wheels against the pole as the apparatus rides along the pole; and
wherein the support frame is comprised of an arm attached to each wheel mount and a parallelogram linkage attached to each arm.

21. An apparatus according to claim 20, further comprising: an angle sensor supported by the support frame for determining the angle measurements between the camera support and each of the parallelogram linkages and for communicating the angle measurements to the controller for controlling the motors.

* * * * *